(12) United States Patent
Zhang et al.

(10) Patent No.: US 10,142,826 B2
(45) Date of Patent: *Nov. 27, 2018

(54) METHOD FOR DETERMINING TARGET, NETWORK ELEMENT, AND SYSTEM FOR DETERMINING TARGET

(71) Applicant: Huawei Technologies Co., Ltd., Shenzhen (CN)

(72) Inventors: Yanping Zhang, Shanghai (CN); Fenqin Zhu, Shanghai (CN); Shufeng Shi, Xi'an (CN); Yuliang Zhi, Tianjin (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/369,240

(22) Filed: Dec. 5, 2016

(65) Prior Publication Data

US 2017/0086057 A1 Mar. 23, 2017

Related U.S. Application Data

(63) Continuation of application No. 14/671,633, filed on Mar. 27, 2015, now Pat. No. 9,538,433, which is a continuation of application No. PCT/CN2012/082222, filed on Sep. 27, 2012.

(51) Int. Cl.
*H04W 4/00* (2018.01)
*H04W 8/04* (2009.01)
(Continued)

(52) U.S. Cl.
CPC ............... *H04W 8/04* (2013.01); *H04W 8/12* (2013.01); *H04W 8/16* (2013.01);
(Continued)

(58) Field of Classification Search
CPC ....... H04W 88/18; H04W 8/08; H04W 48/18; H04W 36/0077; H04W 84/042;
(Continued)

(56) References Cited

U.S. PATENT DOCUMENTS

2009/0270099 A1* 10/2009 Gallagher ............... H04W 8/08
455/435.1
2010/0033424 A1* 2/2010 Kabasawa .............. G01C 17/28
345/156
(Continued)

FOREIGN PATENT DOCUMENTS

CN 1671241 A 9/2005
CN 101616398 A 12/2009
(Continued)

*Primary Examiner* — Joseph Arevalo
(74) *Attorney, Agent, or Firm* — Slater Matsil, LLP

(57) ABSTRACT

Embodiments of the present invention disclose a method, a network element, and a system for determining a target RAT. The method includes: receiving, by an access network element, access control information of a UE that is sent by a mobility management network element, where the access control information includes an identity of a PLMN and a radio access technology RAT allowed and/or a RAT not allowed by the PLMN; and determining, by the access network element, a target RAT for the UE according to the access control information. The present invention can be applied to a shared network environment.

17 Claims, 8 Drawing Sheets

(51) Int. Cl.
  *H04W 48/18* (2009.01)
  *H04W 8/16* (2009.01)
  *H04W 36/00* (2009.01)
  *H04W 84/04* (2009.01)
  *H04W 8/12* (2009.01)

(52) U.S. Cl.
  CPC ....... *H04W 36/0077* (2013.01); *H04W 48/18* (2013.01); *H04W 84/042* (2013.01)

(58) Field of Classification Search
  CPC ......... H04W 8/04; H04W 8/12; H04W 16/14; H04W 16/32; H04W 36/0022
  USPC ... 455/450, 46.1, 436, 444, 433, 423, 422.1, 455/435, 435.1
  See application file for complete search history.

(56) References Cited

U.S. PATENT DOCUMENTS

| | | | | |
|---|---|---|---|---|
| 2012/0122460 A1* | 5/2012 | Dalsgaard | ......... | H04W 36/0061 455/444 |
| 2013/0136115 A1* | 5/2013 | Moisanen | ........... | H04W 76/027 370/338 |
| 2014/0051443 A1* | 2/2014 | Diachina | ........... | H04W 36/0022 455/436 |
| 2014/0128057 A1* | 5/2014 | Siomina | ................ | H04J 3/0685 455/423 |
| 2015/0029973 A1* | 1/2015 | Vesterinen | ............ | H04W 88/06 370/329 |
| 2015/0072678 A1* | 3/2015 | Zhang | ................... | H04W 8/065 455/433 |
| 2015/0109943 A1* | 4/2015 | Sahin | ................... | H04W 48/16 370/252 |
| 2015/0173118 A1* | 6/2015 | Gholmieh | ............ | H04W 76/02 455/436 |
| 2016/0057607 A1* | 2/2016 | Dubesset | ................ | H04W 8/12 455/433 |

FOREIGN PATENT DOCUMENTS

| WO | 2012040918 A1 | 4/2012 | | |
|---|---|---|---|---|
| WO | WO 2012040918 A1 * | 4/2012 | ............ | H04W 36/14 |
| WO | 2012093882 A2 | 7/2012 | | |

* cited by examiner

METHOD FOR DETERMINING TARGET, NETWORK ELEMENT, AND SYSTEM FOR DETERMINING TARGET

CROSS-REFERENCE TO RELATED APPLICATIONS

This application is a continuation of U.S. patent application Ser. No. 14/671,633, filed on Mar. 27, 2015, which is a continuation of International Application No. PCT/CN2012/082222, filed on Sep. 27, 2012. All of the afore-mentioned patent applications are hereby incorporated by reference in their entireties.

TECHNICAL FIELD

The present invention relates to the field of communications technologies, and in particular, to a method for determining a target, a network element, and a system for determining a target.

BACKGROUND

Currently, most network operators achieve a purpose of saving operating expenses by using a shared network architecture, such as a gateway core network (GWCN), or a multi-operator core network (MOCN). Alternatively, the operating expenses are saved by means of roaming. For example, an operator only deploys an LTE network, and a subscriber of the LTE network accesses a 2G/3G network of other operators by means of roaming.

In an environment in which multi-operator networks coexist, generally when determining a target for a UE and migrating the UE, on the basis of information such as a currently used public land mobile network (PLMN), an access network element determines a target network operator or RAT for serving the user equipment (UE), and migrates the UE to a target cell. For example, when the target cell in which the UE is located supports a currently used network operator, the target network operator selected by the access network element is the same as the currently used network operator.

For example, as shown in FIG. 1, operator B deploys an enhanced data rate for global system for mobile communications evolution radio access network (GERAN) and a universal mobile telecommunications system territorial radio access network (UTRAN), and shares a long term evolution network (LTE) with operator A in an MOCN or GWCN manner. Operator A only deploys an LTE network, and generally a UE that belongs to operator A can access the UTRAN or GERAN network of operator B by means of roaming. When the UE is handed over from the UTRAN or GERAN network to the LTE network, a current network operator used by the UE is operator B. Because operator B is supported by an LTE network cell, an access network element always selects operator B as an operator of the LTE network.

During implementation of embodiments of the present invention, it is found that at least the following problem exists in the prior art.

A UE is a subscriber that belongs to operator A but is connected to the LTE network through operator B by means of roaming, which causes a problem that operator A has a low network attachment rate, this is unfavorable for brand building of operator A, and roaming charges of the UE is relatively high.

In another scenario, a same problem exists. For example, operators A, B, and C reach a roaming agreement. However, a UE of operator B is not allowed to access operator A through an RAT such as GERAN, but can access operator C. If the UE of operator B accesses UTRAN of operator A at the beginning, when there are GERAN cells of operator A and operator C, an RNC of operator A migrates the UE to GERAN of operator A during migration decision-making according to the prior art. However, GERAN of operator A does not allow the UE to access GERAN, thereby which causes that the UE fails to access GERAN of operator A, a delay of accessing a network for acquiring a service increases, and user experience is compromised.

SUMMARY

Embodiments of the present invention provide a method for determining a target, a network element, and a system for determining a target, which can solve a problem in the prior art that a network access delay is increased and user experience is compromised because a user equipment cannot implement access by using an access technology in a PLMN; can further solve a problem that it is unfavorable for brand building because an operator has a low user attachment rate in some scenarios; and also solves a problem that roaming charges of UEs are extremely high.

To achieve the foregoing objectives, the present invention uses the following technical solutions:

According to a first aspect, a method for determining a target is provided, including:

receiving, by an access network element, access control information of a user equipment UE that is sent by a mobility management network element, where the access control information includes an identity of a public land mobile network PLMN and a RAT allowed and/or a RAT not allowed by the PLMN; and determining, by the access network element, a target RAT for the UE according to the access control information.

With reference to the first aspect, in a first implementation manner of the first aspect, the PLMN includes:

a PLMN allowing access of the UE; or
an equivalent PLMN of a PLMN serving the UE.

With reference to the first aspect, in a second implementation manner of the first aspect, the determining, by the access network element, a target RAT for the UE according to the access control information includes:

migrating, by the access network element according to the identity of the PLMN and the RAT allowed and/or the RAT not allowed by the PLMN, the UE to the RAT allowed by the PLMN.

With reference to the first aspect, in a third implementation manner of the first aspect, the determining, by the access network element, a target RAT for the UE according to the access control information includes:

avoiding migrating, by the access network element according to the identity of the PLMN and the RAT allowed and/or the RAT not allowed by the PLMN, the UE to the RAT not allowed by the PLMN.

According to a second aspect, a method for determining a target is provided, including:

acquiring, by a mobility management network element, access control information of a user equipment UE; and
sending, by the mobility management network element, the access control information of the UE to an access network element, so that the access network element determines a target RAT for the UE according to the access control information, where the access control information includes an identity of a public land mobile network PLMN and a RAT allowed and/or a RAT not allowed by the PLMN.

With reference to the second aspect, in a first implementation manner of the second aspect, the PLMN includes:
a PLMN allowing access of the UE; or
an equivalent PLMN of a PLMN serving the UE.

With reference to the second aspect, in a second implementation manner of the second aspect, before the acquiring, by a mobility management network element, access control information of a user equipment UE, the method includes:
receiving, by the mobility management network element, subscription data sent by a home location register HLR or a home subscriber server HSS; and
the acquiring, by a mobility management network element, access control information of a user equipment UE includes:
acquiring, by the mobility management network element, the access control information according to the received subscription data.

With reference to the second implementation manner of the second aspect, in a third implementation manner of the second aspect, before the receiving, by the mobility management network element, subscription data sent by an HLR or an HSS, the method includes:
sending, by the mobility management network element, the identity of the PLMN to the HLR or the HSS, so as to request subscription data, corresponding to the PLMN, of the UE.

With reference to the third implementation manner of the second aspect, in a fourth implementation manner of the second aspect, the subscription data includes the RAT allowed and/or the RAT not allowed by the PLMN.

With reference to the third implementation manner of the second aspect, in a fifth implementation manner of the second aspect, the subscription data is access restriction data ARD.

With reference to the third implementation manner of the second aspect, in a sixth implementation manner of the second aspect, the PLMN is included in a PLMN list, and the PLMN list is one or a combination of the following PLMN lists:
a list of PLMNs supported by the mobility management network element or a subset of the PLMN list; a list of PLMNs equivalent to a PLMN supported by the mobility management network element or a subset of the PLMN list; a list of PLMNs equivalent to the PLMN serving the UE or a subset of the PLMN list; a list of PLMNs that have a roaming or a cooperation agreement with a PLMN supported by the mobility management network element or a subset of the PLMN list; a list of PLMNs that have a roaming or cooperation agreement with the PLMN serving the UE or a subset of the PLMN list; a list of PLMNs that belong to a same operator as a PLMN supported by the mobility management network element or a subset of the PLMN list; and a list of PLMNs that belong to a same operator as the PLMN serving the UE or a subset of the PLMN list.

With reference to the sixth implementation manner of the second aspect, in a seventh implementation manner of the second aspect, the sending, by the mobility management network element, the identity of the PLMN to the HLR or the HSS includes:
sending, by the mobility management network element, a location update request message to the HLR or the HSS, where the location update request message includes indication information and a PLMN list that carries the identity of the PLMN, and the indication information is used to request subscription data corresponding to the identity of the PLMN in the PLMN list.

According to a third aspect, an access network element is provided, including:
a first receiving unit, configured to receive access control information of a user equipment UE that is sent by a mobility management network element, where the access control information includes an identity of a public land mobile network PLMN and a RAT allowed and/or a RAT not allowed by the PLMN; and
a target determining unit, configured to determine a target RAT for the UE according to the access control information.

With reference to the third aspect, in a first implementation manner of the third aspect, the PLMN includes:
a PLMN allowing access of the UE; or
an equivalent PLMN of a PLMN serving the UE.

With reference to the third aspect, in a second implementation manner of the third aspect, the target determining unit is configured to:
migrate, according to the identity of the PLMN and the RAT allowed and/or the RAT not allowed by the PLMN, the UE to the RAT allowed by the PLMN.

With reference to the third aspect, in a third implementation manner of the third aspect, the target determining unit is configured to:
avoid migrating, according to the identity of the PLMN and the RAT allowed and/or the RAT not allowed by the PLMN, the UE to the RAT not allowed by the PLMN.

According to a fourth aspect, a mobility management network element is provided, including:
a first acquiring unit, configured to acquire access control information of a user equipment UE; and
a first sending unit, configured to send the access control information of the UE to an access network element, so that the access network element determines a target RAT for the UE according to the access control information, where the access control information includes an identity of a public land mobile network PLMN and a RAT allowed and/or a RAT not allowed by the PLMN.

With reference to the fourth aspect, in a first implementation manner of the fourth aspect, the PLMN includes:
a PLMN allowing access of the UE; or
an equivalent PLMN of a PLMN serving the UE.

With reference to the fourth aspect, in a second implementation manner of the fourth aspect, the mobility management network element further includes:
a first receiving unit, configured to receive subscription data sent by a home location register HLR or a home subscriber server HSS, where
the first acquiring unit is configured to:
acquire the access control information according to the subscription data received by the first receiving unit.

With reference to the second implementation manner of the fourth aspect, in a third implementation manner of the fourth aspect, the first sending unit is further configured to:
send the identity of the PLMN to the HLR or the HSS, so as to request subscription data, corresponding to the PLMN, of the UE.

With reference to the third implementation manner of the fourth aspect, in a fourth implementation manner of the fourth aspect, the subscription data includes the RAT allowed and/or the RAT not allowed by the PLMN.

With reference to the third implementation manner of the fourth aspect, in a fifth implementation manner of the fourth aspect, the subscription data is access restriction data ARD.

With reference to the third implementation manner of the fourth aspect, in a sixth implementation manner of the fourth aspect, the PLMN is included in a PLMN list, and the PLMN list is one or a combination of the following PLMN lists:

a list of PLMNs supported by the mobility management network element or a subset of the PLMN list; a list of PLMNs equivalent to a PLMN supported by the mobility management network element or a subset of the PLMN list; a list of PLMNs equivalent to the PLMN serving the UE or a subset of the PLMN list; a list of PLMNs that have a roaming or a cooperation agreement with a PLMN supported by the mobility management network element or a subset of the PLMN list; a list of PLMNs that have a roaming or cooperation agreement with the PLMN serving the UE or a subset of the PLMN list; a list of PLMNs that belong to a same operator as a PLMN supported by the mobility management network element or a subset of the PLMN list; and a list of PLMNs that belong to a same operator as the PLMN serving the UE or a subset of the PLMN list.

With reference to the sixth implementation manner of the fourth aspect, in a seventh implementation manner of the fourth aspect, the first sending unit is configured to:

send a location update request message to the HLR or the HSS, where the location update request message includes indication information and a PLMN list that carries the identity of the PLMN, and the indication information is used to request subscription data corresponding to the identity of the PLMN in the PLMN list.

According to a fifth aspect, a system for determining a target is provided, including an access network element and a mobility management network element, where:

the access network element is configured to receive access control information of a user equipment UE that is sent by the mobility management network element, where the access control information includes an identity of a public land mobile network PLMN and a RAT allowed and/or a RAT not allowed by the PLMN; and determine a target RAT for the UE according to the access control information; and the mobility management network element is configured to acquire the access control information of the user equipment UE and send the access control information of the UE to the access network element.

According to a sixth aspect, an access network element is provided, including:

a receiver, configured to receive access control information of a user equipment UE that is sent by a mobility management network element, where the access control information includes an identity of a public land mobile network PLMN and a RAT allowed and/or a RAT not allowed by the PLMN; and a processor, configured to determine a target RAT for the UE according to the access control information.

With reference to the sixth aspect, in a first implementation manner of the sixth aspect, the PLMN includes:

a PLMN allowing access of the UE; or an equivalent PLMN of a PLMN serving the UE.

With reference to the sixth aspect, in a second implementation manner of the sixth aspect, the processor is configured to:

migrate, according to the identity of the PLMN and the RAT allowed and/or the RAT not allowed by the PLMN, the UE to the RAT allowed by the PLMN.

With reference to the sixth aspect, in a third implementation manner of the sixth aspect, the processor is configured to:

avoid migrating, according to the identity of the PLMN and the RAT allowed and/or the RAT not allowed by the PLMN, the UE to the RAT not allowed by the PLMN.

According to a seventh aspect, a mobility management network element is provided, including:

a receiver, configured to acquire access control information of a user equipment UE; and a transmitter, configured to send the access control information of the UE to an access network element, so that the access network element determines a target RAT for the UE according to the access control information, where the access control information includes an identity of a public land mobile network PLMN and a RAT allowed and/or a RAT not allowed by the PLMN.

With reference to the seventh aspect, in a first implementation manner of the seventh aspect, the PLMN includes:

a PLMN allowing access of the UE; or an equivalent PLMN of a PLMN serving the UE.

With reference to the seventh aspect, in a second implementation manner of the seventh aspect, the receiver is configured to receive subscription data sent by a home location register HLR or a home subscriber server HSS, and acquire the access control information according to the subscription data.

With reference to the second implementation manner of the seventh aspect, in a third implementation manner of the seventh aspect, the transmitter is further configured to:

send the identity of the PLMN to the HLR or the HSS, so as to request subscription data, corresponding to the PLMN, of the UE.

With reference to the third implementation manner of the seventh aspect, in a fourth implementation manner of the seventh aspect, the subscription data includes the RAT allowed and/or the RAT not allowed by the PLMN.

With reference to the third implementation manner of the seventh aspect, in a fifth implementation manner of the seventh aspect, the subscription data is access restriction data ARD.

With reference to the third implementation manner of the seventh aspect, in a sixth implementation manner of the seventh aspect, the PLMN is included in a PLMN list, and the PLMN list is one or a combination of the following PLMN lists:

a list of PLMNs supported by the mobility management network element or a subset of the PLMN list; a list of PLMNs equivalent to a PLMN supported by the mobility management network element or a subset of the PLMN list; a list of PLMNs equivalent to the PLMN serving the UE or a subset of the PLMN list; a list of PLMNs that have a roaming or a cooperation agreement with a PLMN supported by the mobility management network element or a subset of the PLMN list; a list of PLMNs that have a roaming or cooperation agreement with the PLMN serving the UE or a subset of the PLMN list; a list of PLMNs that belong to a same operator as a PLMN supported by the mobility management network element or a subset of the PLMN list; and a list of PLMNs that belong to a same operator as the PLMN serving the UE or a subset of the PLMN list.

With reference to the sixth implementation manner of the seventh aspect, in a seventh implementation manner of the seventh aspect, the transmitter is configured to:

send a location update request message to the HLR or the HSS, where the location update request message includes indication information and a PLMN list that carries the identity of the PLMN, and the indication information is used to request subscription data corresponding to the identity of the PLMN in the PLMN list.

According to the method for determining a target, the network element, and the system for determining a target provided in embodiments of the present invention, an access network element receives access control information of a user equipment UE that is sent by a mobility management network element, where the access control information includes an identity of a public land mobile network PLMN and a RAT allowed and/or a RAT not allowed by the PLMN; and determines a target RAT for the UE according to the access control information. In this way, according to a correspondence between an RAT and a PLMN in the access control information, a problem that a network access delay is increased and user experience is compromised because an improper PLMN or RAT is selected for a user equipment can be avoided; a problem that it is unfavorable for brand building because an operator has a low user attachment rate in some scenarios can further be solved; and a problem that roaming charges of a UE is extremely high is also solved

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To make the advantages of the technical solutions of the present invention clearer, the following describes the present invention in detail with reference to the accompanying drawings and embodiments.

A mobility management network element provided in the present invention is an SGSN (Serving GPRS Support Node, serving GPRS support node) in a GERAN (GSM EDGE Radio Access Network)/UTRAN (UMTS Territorial Radio Access Network) network, and an MME (Mobility Management Entity) in an E-UTRAN (Evolved UMTS Territorial Radio Access Network) network.

An access network element is a BSC (base station controller) in a GERAN/UTRAN system, an eNodeB (evolved NodeB) in an E-UTRAN system, and an RNC (radio network controller) in a UTRAN system.

Figure 1:
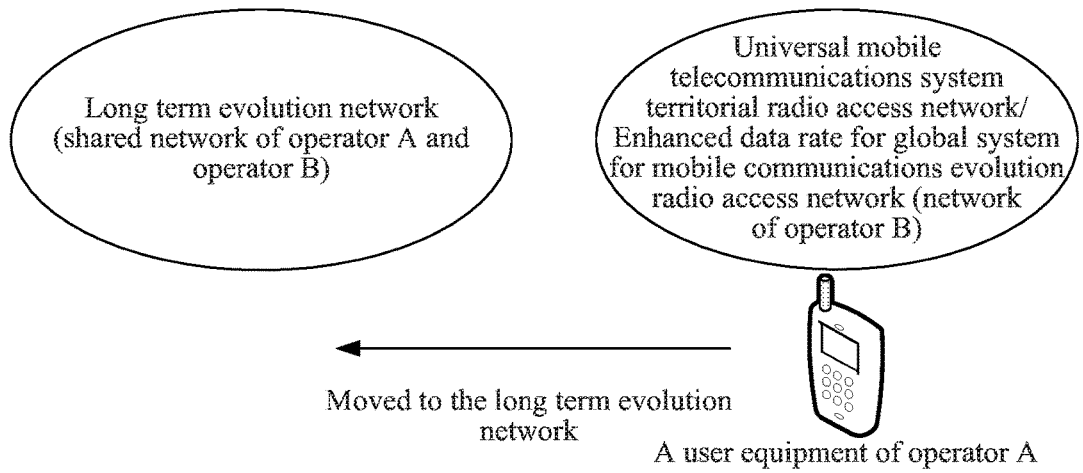
FIG. 1 is a schematic diagram of a network handover scenario in a shared network environment in the prior art.
Figure 2:
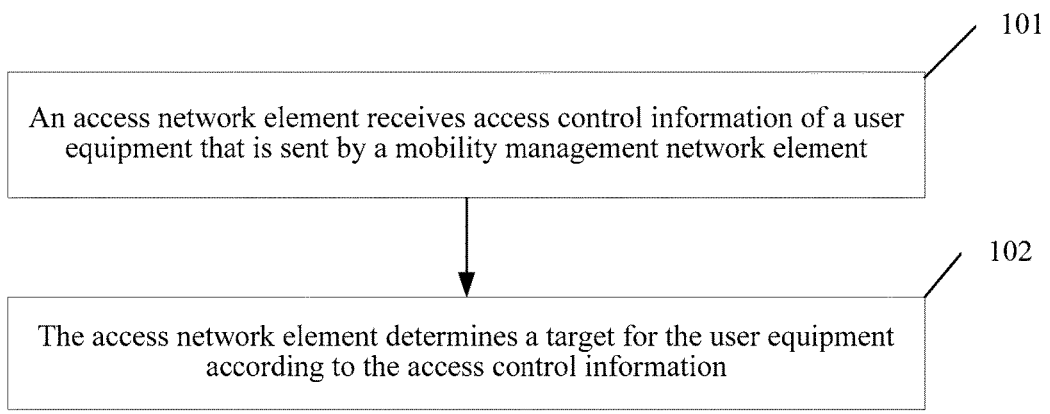
FIG. 2 is a first flowchart of a method for determining a target according to an embodiment of the present invention.

As shown in FIG. 2, a method for determining a target provided in an embodiment of the present invention is described from an access network element side, and the method includes:

101. An access network element receives access control information of a user equipment UE that is sent by a mobility management network element.

The access control information includes an identity of a public land mobile network PLMN and a radio access technology RAT allowed and/or a RAT not allowed by the PLMN.

Exemplarily, the access control information in this embodiment of the present invention includes the RAT allowed and/or the RAT not allowed by the PLMN. The RAT allowed and/or the RAT not allowed by the PLMN may be represented in an explicit manner in which an information element is carried, and the RAT allowed and/or the RAT not allowed by the PLMN may also be represented in an implicit manner. For example, the access control information only includes the identity of the PLMN, which indicates that the PLMN allows all RATs, and may also indicate that the PLMN does not allow any RAT.

102. The access network element determines a target RAT for the UE according to the access control information.

Figure 3:
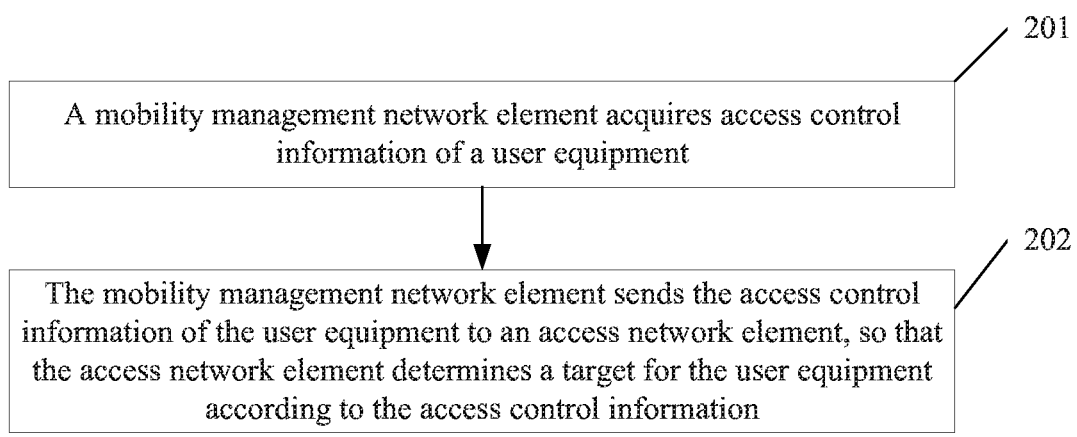
FIG. 3 is a second flowchart of a method for determining a target according to an embodiment of the present invention.

As shown in FIG. 3, a method for determining a target provided in an embodiment of the present invention is described from a mobility management network element side, and the method includes:

201. A mobility management network element acquires access control information of a user equipment UE.

202. The mobility management network element sends the access control information of the UE to an access network element, so that the access network element determines a target RAT for the UE according to the access control information.

The access control information includes an identity of a public land mobile network PLMN and a RAT allowed and/or a RAT not allowed by the PLMN.

According to the method for determining a target provided in this embodiment of the present invention, an access network element receives access control information of a user equipment UE that is sent by a mobility management network element, where the access control information includes an identity of a public land mobile network PLMN and a RAT allowed and/or a RAT not allowed by the PLMN; and determines a target RAT for the UE according to the access control information. In this way, according to a correspondence between an RAT and a PLMN in the access control information, a problem that a network access delay is increased and user experience is compromised because an improper PLMN or RAT is selected for a user equipment can be avoided; a problem that it is unfavorable for brand building because an operator has a low user attachment rate in some scenarios can further be solved; and a problem that roaming charges of a UE is extremely high is also solved.

Figure 4:
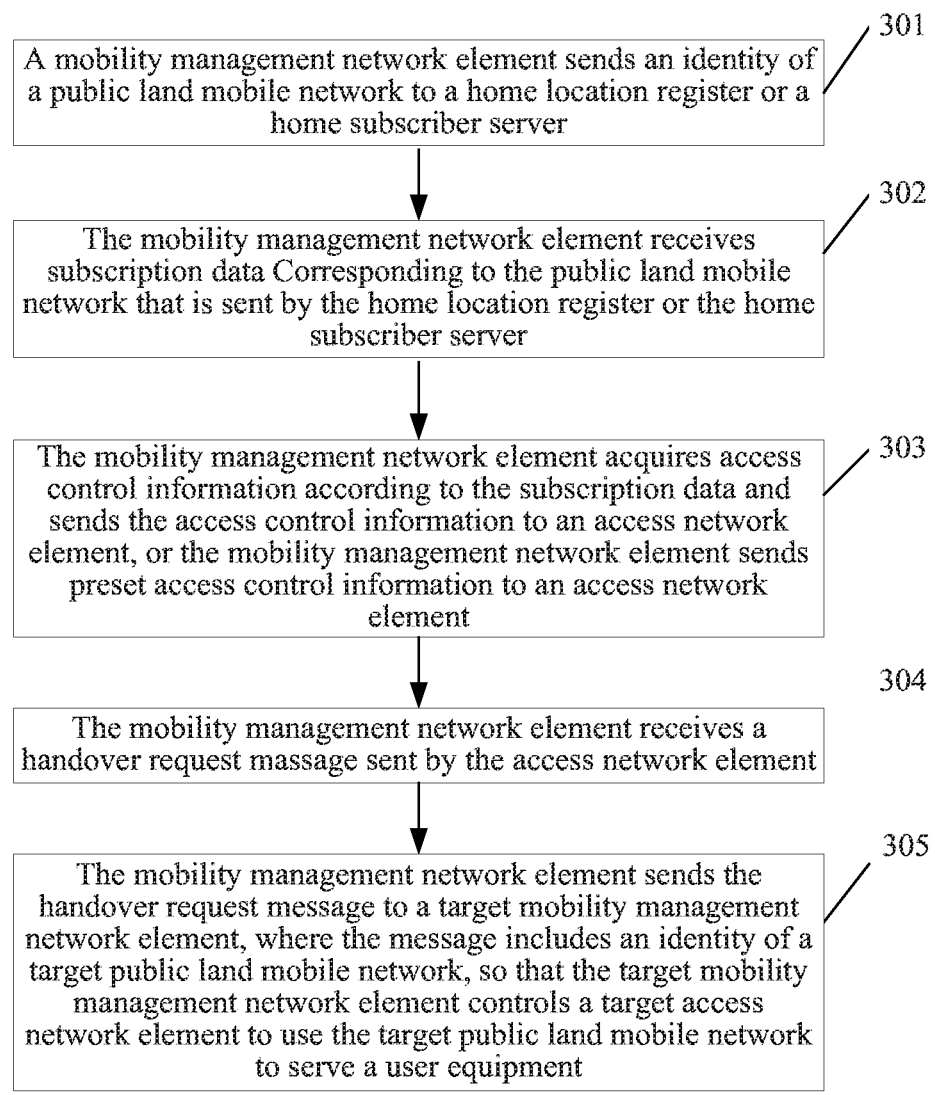
FIG. 4 is a flowchart of a method for determining a target according to another embodiment of the present invention.

As shown in FIG. 4, a method for determining a target provided in another embodiment of the present invention is described from a mobility management network element side, and the method includes:

301. A mobility management network element sends an identity of a PLMN to a home location register HLR or a home subscriber server HSS.

The identity of the PLMN may be included in a PLMN list, and the PLMN list may be one or a combination of the following PLMN lists: a list of PLMNs supported by the mobility management network element or a subset of the PLMN list; a list of PLMNs equivalent to a PLMN supported by the mobility management network element or a subset of the PLMN list; a list of PLMNs equivalent to a PLMN serving a UE or a subset of the PLMN list; a list of PLMNs that have a roaming or a cooperation agreement with a PLMN supported by the mobility management network element or a subset of the PLMN list; a list of PLMNs that have a roaming or cooperation agreement with the PLMN serving the UE or a subset of the PLMN list; a list of PLMNs that belong to a same operator as a PLMN supported by the mobility management network element or a subset of the PLMN list; and a list of PLMNs that belong to a same operator as the PLMN serving the UE or a subset of the PLMN list. However, the present invention is not limited thereto, and sets no limitation.

A message may further include indication information, and the indication information is used to instruct to request a subscription data type corresponding to a PLMN in the list. The subscription data type may be identified by the PLMN list, that is, the PLMN list also includes information that requests the subscription data type corresponding to the PLMN in the list; or the subscription data type is identified by an independent information element, which is not limited in this embodiment.

In the present invention, the requested subscription data type may be access restriction data (Access Restriction Data, ARD for short), or an RAT that a PLMN allows and/or does not allow to access.

302. The mobility management network element receives subscription data that is corresponding to the PLMN and is sent by the home location register HLR or the home subscriber server HSS. Herein, the premise that the mobility management network element can receive the subscription data corresponding to the PLMN is that the PLMN allows access of an UE. That is, there is at least one RAT that allows the UE to access the PLMN; otherwise, the HSS does not return the subscription data corresponding to the PLMN. Step 303 or step 304 continues to be performed.

If the requested subscription data type is indicated, the subscription data is subscription data corresponding to the subscription data type.

The subscription data is a RAT allowed and/or a RAT not allowed by the PLMN, or access restriction data ARD corresponding to the PLMN.

If the PLMN is included in a PLMN list sent to the HSS, the HSS returns subscription data corresponding to a PLMN, which allows access of an UE, in the PLMN list, and the PLMN that allows access of an UE may be an equivalent PLMN of a PLMN serving the UE.

Specifically, content of an RAT allowed and/or an RAT not allowed by each PLMN in the PLMN list may be represented in multiple forms. For example, a PLMN list is listed, and an RAT that each PLMN allows to access the PLMN itself is listed. For another example, a PLMN list is listed and an RAT that each PLMN forbids to access the PLMN itself is listed, and an RAT that each PLMN allows to access the PLMN itself may also be learned according to the RAT that each PLMN forbids to access the PLMN itself. Both an RAT allowed by each PLMN and an RAT not allowed by each PLMN may further be listed. In addition, an RAT list may further be listed and a PLMN supported by each RAT is listed, or a PLMN not supported by each RAT is listed. It should be noted that the PLMN and the RAT may further have multiple correspondences so long as an RAT that each PLMN allows to access the PLMN itself can be learned, which is not limited herein.

The RAT in the present invention may be but is not limited to:

GERAN, UTRAN, E-UTRAN, I-HSPA-Evolution, and the like.

303. The mobility management network element acquires access control information according to the subscription data and sends the access control information to an access network element, or the mobility management network element sends preset access control information to an access network element, so that the access network element determines a target (determine a target for subsequent mobility action) according to the access control information.

For the preset access control information, which is used as an alternative solution of the access control information generated according to the subscription data (the subscription data is acquired according to the foregoing step 301 and step 302), an operator may pre-configure the access control information of the UE on the mobility management network element. For example, a UE that belongs to an operator is not allowed to access a specific RAT in a PLMN. The mobility management network element sends the access control information to the access network element.

The access control information includes an identity of a PLMN (PLMN ID) and an RAT allowed and/or an RAT not allowed by the PLMN. The identity of the PLMN may represent the PLMN which allows access of the UE, except the PLMN serving the UE, or the equivalent PLMN of the PLMN serving the UE. The access control information may include a list of multiple PLMNs and RATs allowed and/or RATs not allowed by the PLMNs. A manifestation of the PLMN list may be a list of PLMN IDs and allowed RATs and/or disallowed RATs {(PLMN ID1, allowed RAT and/or disallowed RAT), (PLMN ID2, allowed RAT and/or disallowed RAT) . . . }, where there may be zero, one, or multiple allowed RATs, and there may be zero, one, or multiple disallowed RATs. The manifestation of the list may further be a list of allowed RATs and PLMNs that allow the RATs {(RAT1, PLMN1, PLMN2), (RAT2, PLMN1, PLMN3) . . . }, where there may be one or more allowed RATs, and there may be one or more PLMNs that allow the RATs.

The acquiring the access control information according to the subscription data may be specifically that according to a PLMN and an RAT allowed and/or an RAT not allowed by the PLMN that are in a PLMN list in the subscription data, a PLMN serving the UE, and the subscription data, and further with reference to current location information of the UE, a PLMN ID that may be allowed by the UE and an RAT allowed and/or an RAT not allowed by the PLMN are determined and sent to the access network element. With reference to the PLMN serving the UE, a list of equivalent PLMNs of the PLMN serving the UE and an RAT allowed and/or an RAT not allowed by a PLMN in the list are generated and sent to the access network element.

The access control information sent by the mobility management network element may be implemented by extending an existing information element. For example, in E-UTRAN, a Handover Restriction List is extended, and in a list of allowed PLMNs, information about an allowed RAT and/or a disallowed RAT is added to each PLMN. For a PLMN to which no RAT information description is added, all RATs may be allowed or not allowed to access the PLMN by default. A shared network area (SNA) information element in GERAN/UTRAN is extended. In a list of allowed PLMNs, information about an allowed RAT and/or a disallowed RAT is added to each PLMN. For a PLMN to which no RAT information description is added, all RATs may be allowed or not allowed to access the PLMN by default, which is not limited herein.

Specifically, the determining a target (Mobility Decision) by the access network element according to the access control information may be specifically that the access network element, according to the PLMN list and the RAT allowed and/or the RAT not allowed by the PLMN in the list, migrates the UE to the RAT allowed by the PLMN, where a migration manner may be handover, redirection, a cell change order, or the like; or avoids migrating the UE to the RAT not allowed by the PLMN. Optionally, the migration manner is handing over the UE. When there are multiple candidate PLMNs, a target PLMN and a target RAT are determined according to a PLMN list and an RAT allowed and/or an RAT not allowed by a PLMN in the list, where the target PLMN allows the UE to access the target RAT. The access network element may also perform determining with reference to other determining factors. For example, signal strength of a candidate target cell and a locally configured migration algorithm are considered together for determining. It should be noted that the present invention only provides an implementation manner in which an access network element determines a target for a UE (determine a target for subsequent mobility action) according to a PLMN and an allowed RAT and/or a disallowed RAT, but is not limited thereto.

304. The mobility management network element receives a handover request massage sent by the access network element.

Specifically, step 304 may include two manners, 304A and 304B. In 304A, the access network element determines a target and determines to initiate handover, and the message may include a target PLMN ID and a target RAT.

The target PLMN ID may be implemented by using a preset independent information element, and may also be carried in an existing information element. For example, the target PLMN ID is included in a target cell in a GERAN network, in a target tracking area identity (TAI) in an E-UTRAN network, or in a target radio network controller identity (RNC ID), but the present invention is not limited thereto, and sets no limitation herein.

The target RAT may be explicit independent information, and may also be implicit information identified by another information element, such as a handover cause value, which is not limited by the present invention.

304B. As an alternative solution of 304A, the mobility management network element does not send the access control information to the access network element in step 303. When a handover process is initiated, the access network element may send a handover command that carries information about a target RAT to the mobility management network element; and the access network element may, according to signal strength of a candidate target cell and a cell selection algorithm, select a target cell and determine the target RAT, which is not limited by the present invention. The target RAT may be explicit independent information, and may also be implicit information identified by another information element, such as a handover cause value, which is not limited by the present invention.

The mobility management network element may find a PLMN allowed by the target RAT, in the preset access control information or the subscription data, and further determines a target PLMN. For example, in the subscription data, if the target RAT is corresponding to only one PLMN, the PLMN corresponding to the target RAT is the target PLMN. For another example, in the subscription data, if the target RAT is corresponding to multiple PLMNs, a PLMN with a highest priority among the multiple PLMNs is selected as the target PLMN according to priorities of the multiple PLMNs. For example, a PLMN that is corresponding to the target RAT and is serving the user equipment may be used as the PLMN with the highest priority, so that the PLMN with the highest priority is used as the target PLMN, but the present invention is not limited thereto.

305. The mobility management network element sends the handover request message to a target mobility management network element, where the message includes a target PLMN ID, so that the target mobility management network element controls a target access network element to use the target PLMN to serve a user equipment.

According to the method for determining a target provided in another embodiment of the present invention, an access network element receives access control information of a user equipment UE that is sent by a mobility management network element, where the access control information includes an identity of a public land mobile network PLMN and a RAT allowed and/or a RAT not allowed by the PLMN; and determines a target RAT for the UE according to the access control information. In this way, according to a correspondence between an RAT and a PLMN in the access control information, a problem that a network access delay is increased and user experience is compromised because an improper PLMN or RAT is selected for a user equipment can be avoided; a problem that it is unfavorable for brand building because an operator has a low user attachment rate in some scenarios can further be solved; and a problem that roaming charges of a UE is extremely high is also solved.

Figure 5:
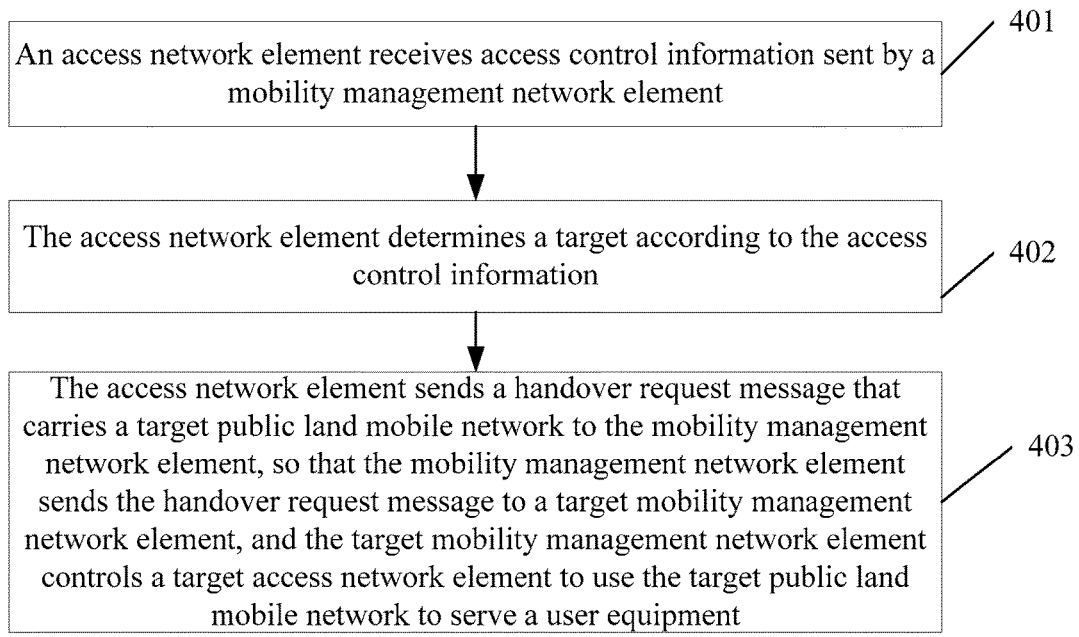
FIG. 5 is a flowchart of a method for determining a target according to still another embodiment of the present invention.

As shown in FIG. 5, a method for determining a target provided in still another embodiment of the present invention is described from an access network element side, and the method includes:

401. An access network element receives access control information sent by a mobility management network element.

The access control information includes an identity of a PLMN (PLMN ID) and an RAT allowed and/or RATs not allowed by the PLMN. The PLMN is a PLMN, which allows access of an UE, except a PLMN serving the UE, or an equivalent PLMN of the PLMN serving the UE. The control information may include a list of multiple PLMNs and RATs allowed and/or RATs not allowed by the PLMNs. A manifestation of the list may be a list of PLMN IDs and allowed RATs and/or disallowed RATs {(PLMN ID1, allowed RAT and/or disallowed RAT), (PLMN ID2, allowed RAT and/or disallowed RAT) . . . }, where there may be zero, one, or multiple allowed RATs; and there may be zero, one, or multiple disallowed RATs. The manifestation of the list may further be a list of allowed RATs and PLMNs that allow the RATs {(RAT1, PLMN1, PLMN2), (RAT2, PLMN1, PLMN3) . . . }, where there may be one or more allowed RATs, and there may be one or more PLMNs that allow the RATs.

402. The access network element determines a target (determine a target for subsequent mobility action) according to the access control information. If it is determined to hand over a UE, step 403 is performed.

Specifically, the determining a target (determine a target for subsequent mobility action) by the access network element according to the access control information may be that the access network element, according to an RAT allowed and/or an RAT not allowed by a PLMN, migrates the UE to the RAT allowed by the PLMN, where a migration manner may be handover, redirection, a cell change order, or the like; or avoids migrating, in a manner of handover, redirection, a cell change order, or the like, the UE to the RAT not allowed by the PLMN. Optionally, the migration manner is handing over the UE. When there are multiple candidate PLMNs, a target PLMN and a target RAT are determined according to a PLMN list and an RAT allowed and/or an RAT not allowed by a PLMN in the list, where the target PLMN allows the UE to access the target RAT. The access network element may also perform determining with reference to other determining factors. For example, signal strength of a candidate target cell and a locally configured migration algorithm are considered together for determining. It should be noted that the present invention only provides an implementation manner in which an access network element determines a target according to a PLMN and an allowed RAT and/or a disallowed RAT, but is not limited thereto.

403. The access network element sends a handover request message that carries a target PLMN to the mobility management network element, so that the mobility management network element sends the handover request message to a target mobility management network element, and the target mobility management network element controls a target access network element to use the target PLMN to serve the user equipment.

Specifically, the handover request message that carries the target PLMN and that is sent by the access network element to the mobility management network element may be implemented by using a preset independent information element, and may also be carried in an existing information element. For example, the message is included in a target cell in a GERAN network, in a target tracking area identity (TAI) in an E-UTRAN network, or in a target radio network controller identity (RNC ID), but the present invention is not limited thereto, and sets no limitation herein.

In addition, if steps 401-403 are not performed, the access network element may further send a handover command to the mobility management network element, so that after acquiring subscription data, the mobility management network element selects a target PLMN for the user equipment according to the subscription data, forms a handover request message that carries the target PLMN, and sends the handover request message to a target mobility management network element, so that the target mobility management network element controls a target access network element to use the target PLMN to serve the user equipment.

Specifically, the access network element may further send a handover command that carries a target RAT to the mobility management network element. In this way, the mobility management network element may find a PLMN, corresponding to the target RAT, in the subscription data, so as to further determine a target PLMN. For example, in the subscription data, if the target RAT is corresponding to only one PLMN, the PLMN corresponding to the target RAT is the target PLMN. For another example, in the subscription data, if the target RAT is corresponding to multiple PLMNs, a PLMN with a highest priority among the multiple PLMNs is selected as the target PLMN according to priorities of the multiple PLMNs. For example, a PLMN that is corresponding to the target RAT and is serving the user equipment may be used as the PLMN with the highest priority, so that the PLMN with the highest priority is used as the target PLMN, but the present invention is not limited thereto.

According to the method for determining a target provided in still another embodiment of the present invention, an access network element receives access control information of a user equipment UE that is sent by a mobility management network element, where the access control information includes an identity of a public land mobile network PLMN and a RAT allowed and/or a RAT not allowed by the PLMN; and determines a target RAT for the UE according to the access control information. In this way, according to a correspondence between an RAT and a PLMN in the access control information, a problem that a network access delay is increased and user experience is compromised because an improper PLMN or RAT is selected for a user equipment can be avoided; a problem that it is unfavorable for brand building because an operator has a low user attachment rate in some scenarios can further be solved; and a problem that roaming charges of a UE is extremely high is also solved.

Figure 6:
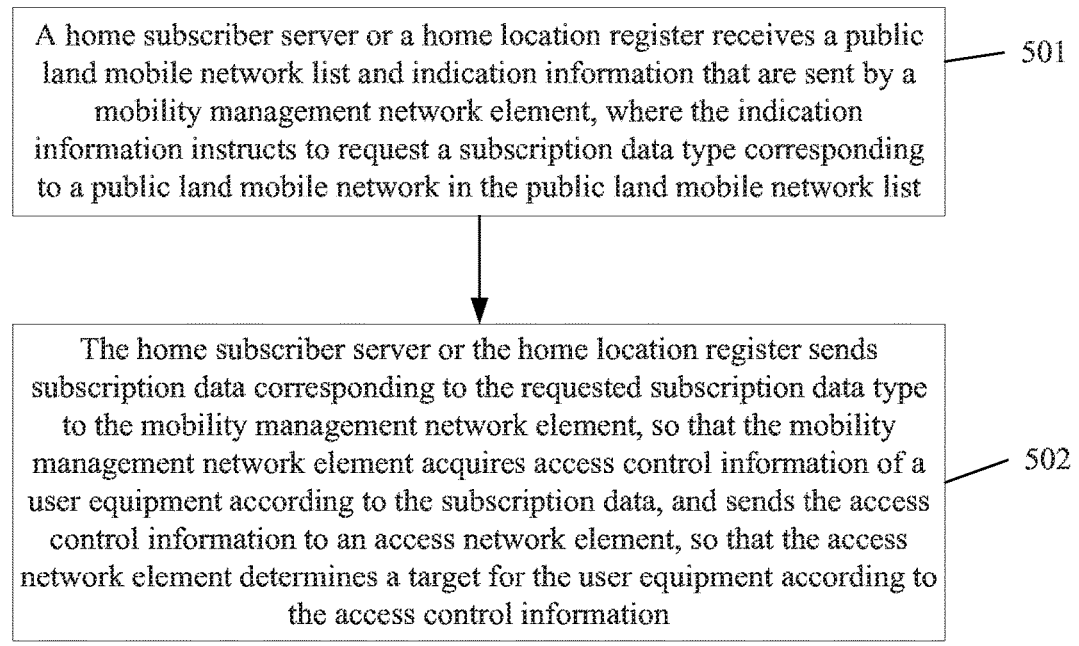
FIG. 6 is a flowchart of a method for determining a target according to yet another embodiment of the present invention.

As shown in FIG. 6, a method for determining a target provided in yet another embodiment of the present invention is described from a home subscriber server HSS side or a home location register HLR side, and the method includes:

501. An HSS or an HLR receives a PLMN list and indication information that are sent by a mobility management network element, where the indication information instructs to request a subscription data type corresponding to a PLMN in the PLMN list. The indication information may be identified by the PLMN list, that is, the PLMN list also includes information that requests the subscription data type corresponding to the PLMN in the list; or the indication information is identified by an independent information element, which is not limited in this embodiment.

A definition of the PLMN list is the same as a definition of the PLMN list in step 301 in FIG. 4, and is not described again in this embodiment.

502. The HSS or the HLR sends subscription data corresponding to the requested subscription data type to the mobility management network element, so that the mobility management network element acquires access control information of a user equipment UE according to the subscription data, and sends the access control information to an access network element so that the access network element determines a target RAT for the UE according to the access control information.

The requested subscription data is corresponding to the PLMN in the PLMN list.

A specific definition of the subscription data is the same as a definition of the subscription data in step 302 in FIG. 4, and is not described again in this embodiment.

According to the method for determining a target provided in yet another embodiment of the present invention, an access network element receives access control information of a user equipment UE that is sent by a mobility management network element, where the access control information includes an identity of a public land mobile network PLMN and a RAT allowed and/or a RAT not allowed by the PLMN; and determines a target RAT for the UE according to the access control information. In this way, according to a correspondence between an RAT and a PLMN in the access control information, a problem that a network access delay is increased and user experience is compromised because an improper PLMN or RAT is selected for a user equipment can be avoided; a problem that it is unfavorable for brand building because an operator has a low user attachment rate in some scenarios can further be solved; and a problem that roaming charges of a UE is extremely high is also solved.

Figure 7:
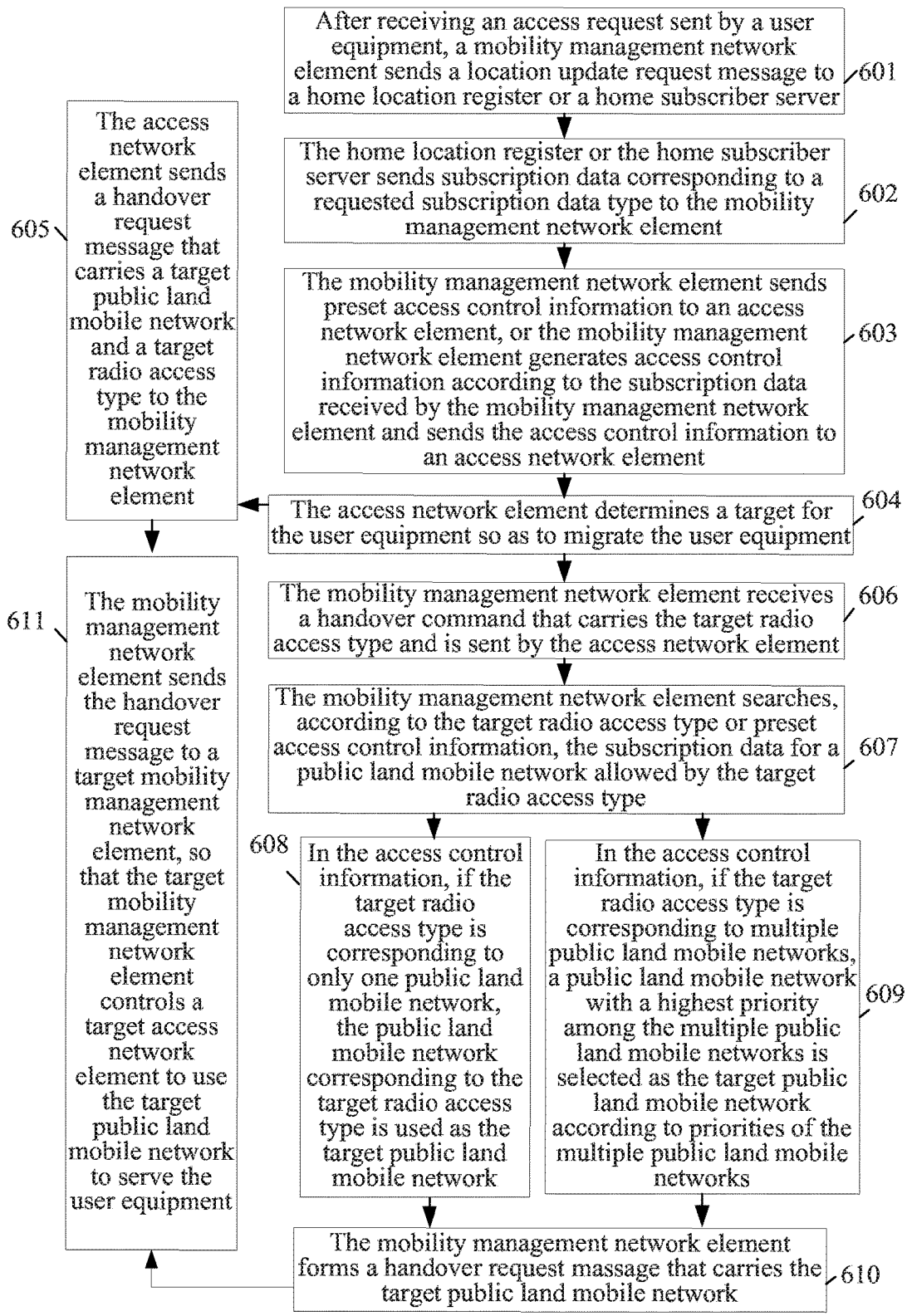
FIG. 7 is a flowchart of a method for determining a target according to yet another embodiment of the present invention.

As shown in FIG. 7, a method for determining a target provided in yet another embodiment of the present invention includes:

601. After receiving an access request sent by a user equipment, such as a (combined) attach request and a (combined) RAU request, a mobility management network element sends a location update request message to an HLR or an HSS. The request message includes an identity of a PLMN; the identity of the PLMN may be included in a PLMN list; and the PLMN list may be one or a combination of the following PLMN lists: a list of PLMNs supported by the mobility management network element or a subset of the PLMN list; a list of PLMNs equivalent to a PLMN supported by the mobility management network element or a subset of the PLMN list; a list of PLMNs equivalent to a PLMN serving the UE or a subset of the PLMN list; a list of PLMNs that have a roaming or a cooperation agreement with a PLMN supported by the mobility management network element or a subset of the PLMN list; a list of PLMNs that have a roaming or cooperation agreement with the PLMN serving the UE or a subset of the PLMN list; a list of PLMNs that belong to a same operator as a PLMN supported by the mobility management network element or a subset of the PLMN list; and a list of PLMNs that belong to a same operator as the PLMN serving the UE or a subset of the PLMN list. The present invention sets no limitation thereto.

The message may further include indication information that requests a subscription data type related to the PLMN, where the indication information instructs the HSS to provide the subscription data type related to the PLMN. In the present invention, the mobility management network element needs to acquire information about an RAT allowed and/or an RAT not allowed by the PLMN. The indication information may be an explicit indication. Access restriction data (ARD) is used as an example for description in this embodiment, and the mobility management network element may add (PLMN list, ARD) to the message to identify that the information about an RAT allowed and/or an RAT not allowed by the PLMN needs to be acquired.

Alternatively, the indication information may be identified by a PLMN list information element, that is, the PLMN list information element is used to identify subscription data that needs to be acquired. For example, it is agreed that a PLMN list1 information element is used to acquire a subscription about an RAT allowed and/or an RAT not allowed by a PLMN to access, and a PLMN list2 information element is used to acquire CSG subscription and the like of these PLMNs. If the mobility management network element needs to acquire the subscription about the RAT allowed and/or the RAT not allowed by the PLMN to access, the PLMN lists information element is used to send a PLMN list. The present invention sets no limitation.

602. The HLR or the HSS sends subscription data corresponding to a requested subscription data type to the mobility management network element. The premise is that the PLMN allows access of the UE. That is, there is at least one RAT that allows the UE to access the PLMN; otherwise, the HSS does not return the subscription data corresponding to the PLMN. Step 603 continues to be performed. If a PLMN list is included in step 601, the HLR/HSS sends, to the mobility management network element, subscription data corresponding to a PLMN that is in the list and allows access of the UE, where the PLMN that allows access of the UE may be an equivalent PLMN of the PLMN serving the UE. Particularly, if a specific required subscription data type is indicated, subscription data corresponding to the requested subscription data type is sent to the mobility management network element. In the present invention, the requested subscription data type may be an RAT that each PLMN allows and/or not does allow to access, and a specific subscription data type may be ARD. If the PLMN is included a PLMN list sent to the HSS, the HSS returns subscription data corresponding to the PLMN in the PLMN list. The HSS/HLR sends, to the mobility management network element, information about an RAT that the PLMN allows and/or does not allow to access in the PLMN list; and an existing ARD information element, (PLMN1, ARD); (PLMN2, ARD), and the like, may be reused as the information about the RAT allowed and/or the RAT not allowed to access. As another implementation manner, a new information element may also be defined to identify the RAT that the PLMN allows and/or does not allow to access.

Specifically, if subscription data returned by the HSS is the RAT allowed and/or the RAT not allowed by the PLMN in the PLMN list, content of the RAT allowed and/or the RAT not allowed by each PLMN to access in the subscription data may be represented in multiple forms. For example, a PLMN list is listed, and an RAT that each PLMN allows to access is listed, {PLMN1, E-UTRAN, UTRAN}; therefore, the UE is not allowed to access GERAN. For another example, a PLMN list is listed and an RAT that each PLMN forbids to access is listed, (PLMN, GERAN); and an RAT that each PLMN allows to access may also be learned according to the RAT that each PLMN forbids to access. Because it is not allowed to access GERAN, it indicates that UTRAN and E-UTRAN can be accessed. A PLMN list may further be provided, and both an RAT allowed by each PLMN to access and an RAT not allowed by each PLMN to access are listed, such as (PLMN, GERAN allowed, UTRAN allowed, E-UTRAN not allowed). In addition, an RAT list may further be listed, and a PLMN supported by each RAT is listed, or a PLMN not supported by each RAT is listed. It should be noted that the PLMN and the RAT may have multiple correspondences so long as an RAT that each PLMN allows to access can be learned, which is not limited herein.

In the present invention, the RAT may include but is not limited to GERAN, UTRAN, E-UTRAN, I-HSPA-Evolution, and the like.

603. The mobility management network element sends preset access control information to an access network element, or the mobility management network element generates access control information according to the subscription data received by the mobility management network element, and sends the access control information to an access network element.

The access control information is a PLMN ID and a list of RATs allowed and/or RATs not allowed by the PLMN. The PLMN ID is a PLMN ID, which allows the UE to access the PLMN, except the PLMN serving the UE; or an equivalent PLMN ID of the PLMN serving the UE. A manifestation of the list may be a list of PLMN IDs and allowed RATs and/or disallowed RATs {(PLMN ID1, allowed RAT and/or disallowed RAT, (PLMN ID2, allowed RAT and/or disallowed RAT) . . . }, where there may be zero, one, or multiple allowed RATs, and there may be zero, one, or multiple disallowed RATs. The manifestation of the list may further be a list of allowed RATs and PLMNs that allow the RATs {(RAT1, PLMN1, PLMN2), (RAT2, PLMN1, PLMN3) . . . }, where there may be one or more allowed RATs, and there may be one or more PLMNs that allow the RATs.

The mobility management network element may extend an existing information element. For example, in E-UTRAN, a Handover Restriction List is extended, and in a list of allowed PLMNs, information about an allowed RAT and/or a disallowed RAT is added to each PLMN. For a PLMN to which no RAT information description is added, all RATs may be allowed or not allowed to access the PLMN by default. A shared network area (SNA) information element in GERAN/UTRAN. In a list of allowed PLMNs, information about an allowed RAT and/or a disallowed RAT is added to each PLMN. For a PLMN to which no RAT information description is added, all RATs may be allowed or not allowed to access the PLMN by default. A new information element may also be introduced on an interface to increase a list of allowed PLMNs and a corresponding RAT allowed and/or RAT not allowed by a PLMN in the PLMN list.

In the present invention, the sending the access control information by the mobility management network element is not limited to a processing procedure of the access request of the user equipment, that is, the access request is not limited to (combined) attach and (combined) RAT/TAU, and may also be a handover process.

Sending a message about access control information is only a manner of sending access control information, and the message may be but is not limited to an initial UE message or a common ID (common ID) message.

In a step after steps 601 to 603 or a step independent of steps 601 to 603 that is only used as an implementation step of the present invention, the access network element needs to determine a target RAT for the UE. For example, the UE currently has a relatively weak access signal and needs to migrate the UE. (an example that step 604 continues after step 603 is used for description in FIG. 7): 604. The access network element determines a target RAT for the UE so as to migrate the UE. If a migration manner is handing over the UE, step 605 or step 606 is performed.

It should be specially noted that the determining a target RAT for the UE according to the access control information in steps 604/605/606 is an implementation manner provided in the present invention, which ensures that when accessing an RAT, the UE can select a correct PLMN service, providing user experience. The present invention sets no limitation on other implementation manners in which a correct PLMN is selected by using the control information.

605. The access network element sends a handover request message that carries a target PLMN and a target RAT to the mobility management network element. Step 611 is performed.

The target PLMN and target RAT are determined for the UE by the access network element according to the access control information. Specifically, the access network element, according to the RAT allowed and/or the RAT not allowed by the PLMN, migrates the UE to the RAT allowed by the PLMN, where the migration manner may be handover, redirection, a cell change order, or the like; or avoids migrating the UE to the RAT not allowed by the PLMN. Optionally, the migration manner is handing over the UE. When there are multiple candidate PLMNs, a target PLMN and a target RAT are determined according to a PLMN list and an RAT allowed and/or an RAT not allowed by a PLMN in the list, where the target PLMN allows the UE to access the target RAT. The access network element may also perform determining with reference to other determining factors. For example, signal strength of a candidate target cell and a locally configured migration algorithm are considered together for determining. It should be noted that the present invention only provides an implementation manner in which an access network element determines a target according to a PLMN and an allowed RAT and/or a disallowed RAT, but is not limited thereto.

The handover request message that carries the target PLMN and that is sent by the access network element to the mobility management network element may be implemented by using a preset independent information element, and may also be carried in an existing information element. For example, the message is included in a target cell in a GERAN network, in a target tracking area identity (TAI) in an E-UTRAN network, or in a target radio network controller identity (RNC ID), but the present invention is not limited thereto, and sets no limitation herein.

The target RAT may be explicit independent information, and may also be implicit information identified by another information element, such as a handover cause value, which is not limited by the present invention.

606. The mobility management network element receives a handover command that carries the target RAT and is sent by the access network element.

Specifically, the access network element may, according to signal strength of a candidate target cell and a cell selection algorithm, select a target cell and determine the target RAT, and the present invention sets no limitation. The target RAT may be explicit independent information, and may also be implicit information identified by another information element, such as a handover cause value, which is not limited by the present invention.

607. The mobility management network element searches, according to the target RAT or preset access control information, the subscription data for a PLMN allowed by the target RAT. Step 608 or 609 is performed.

Specifically, the mobility management network element may find a PLMN, corresponding to the target RAT, in the subscription data, so as to further determine a target PLMN.

608. In the access control information, if the target RAT is corresponding to only one PLMN, the PLMN corresponding to the target RAT is used as the target PLMN. Step 610 continues to be performed.

609. In the access control information, if the target RAT is corresponding to multiple PLMNs, a PLMN with a highest priority among the multiple PLMNs is selected as the target PLMN according to priorities of the multiple PLMNs. The process proceeds to step 610.

For example, a PLMN that is corresponding to the target RAT and is serving the user equipment may be used as the PLMN with the highest priority, so that the PLMN with the highest priority is used as the target PLMN, but the present invention is not limited thereto.

610. The mobility management network element generates a handover request massage that carries the target PLMN. Step 611 is performed.

611. The mobility management network element sends the handover request message to a target mobility management network element, so that the target mobility management network element controls a target access network element to use the target PLMN to serve the user equipment.

According to the method for determining a target provided in yet another embodiment of the present invention, an access network element receives access control information of a user equipment UE that is sent by a mobility management network element, where the access control information includes an identity of a public land mobile network PLMN and a RAT allowed and/or a RAT not allowed by the PLMN; and determines a target RAT for the UE according to the access control information. In this way, according to a correspondence between an RAT and a PLMN in the access control information, a problem that a network access delay is increased and user experience is compromised because an improper PLMN or RAT is selected for a user equipment can be avoided; a problem that it is unfavorable for brand building because an operator has a low user attachment rate in some scenarios can further be solved; and a problem that roaming charges of a UE is extremely high is also solved.

Figure 8:
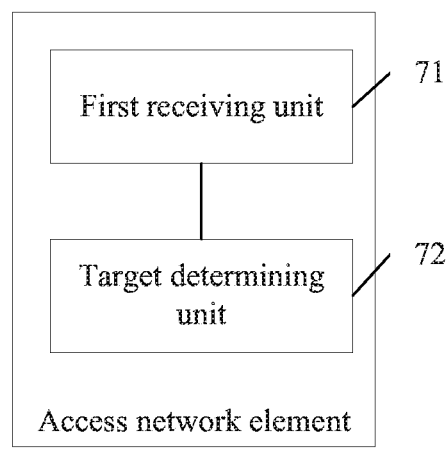
FIG. 8 is a schematic structural diagram of an access network element according to an embodiment of the present invention.

As shown in FIG. 8, an access network element provided in an embodiment of the present invention includes:

a first receiving unit 71, configured to receive access control information of a user equipment UE that is sent by a mobility management network element, where the access control information includes an identity of a public land mobile network PLMN and a RAT allowed and/or a RAT not allowed by the PLMN; and a target determining unit 72, configured to determine a target RAT for the UE according to the access control information.

Specifically, the PLMN includes a PLMN allowing access of the UE, or an equivalent PLMN of a PLMN serving the UE.

Specifically, the target determining unit 72 is configured to:

migrate, according to the identity of the PLMN and the RAT allowed and/or the RAT not allowed by the PLMN, the UE to the RAT allowed by the PLMN.

Specifically, the target determining unit 72 is further configured to:

avoid migrating, according to the identity of the PLMN and the RAT allowed and/or the RAT not allowed by the PLMN, the UE to the RAT not allowed by the PLMN.

According to the access network element provided in this embodiment of the present invention, the access network element receives access control information of a user equipment UE that is sent by a mobility management network element, where the access control information includes an identity of a public land mobile network PLMN and a RAT allowed and/or a RAT not allowed by the PLMN; and determines a target RAT for the UE according to the access control information. In this way, according to a correspondence between an RAT and a PLMN in the access control information, a problem that a network access delay is increased and user experience is compromised because an improper PLMN or RAT is selected for a user equipment can be avoided; a problem that it is unfavorable for brand building because an operator has a low user attachment rate in some scenarios can further be solved; and a problem that roaming charges of a UE is extremely high is also solved.

Figure 9:
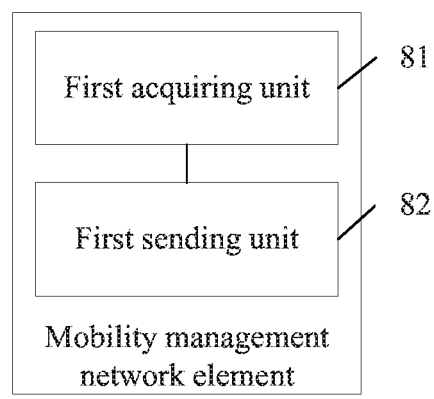
FIG. 9 is a first schematic structural diagram of a mobility management network element according to an embodiment of the present invention.

As shown in FIG. 9, a mobility management network element provided in an embodiment of the present invention includes:

a first acquiring unit 81, configured to acquire access control information of a user equipment UE; and a first sending unit 82, configured to send the access control information of the UE to an access network element, so that the access network element determines a target RAT for the UE according to the access control information, where the access control information includes an identity of a public land mobile network PLMN and a RAT allowed and/or a RAT not allowed by the PLMN.

Specifically, the PLMN includes a PLMN allowing access of the UE, or an equivalent PLMN of a PLMN serving the UE.

Figure 10:
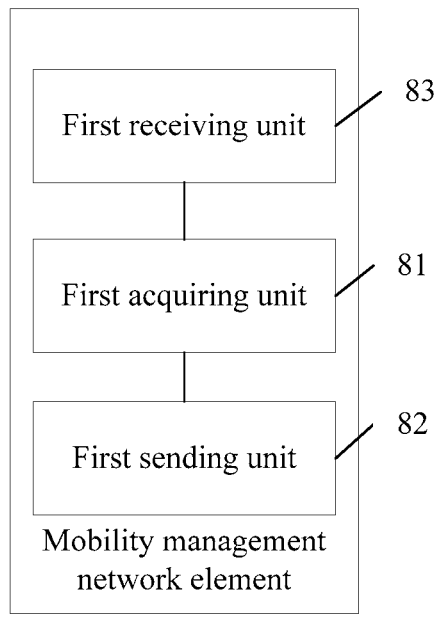
FIG. 10 is a second schematic structural diagram of a mobility management network element according to an embodiment of the present invention.

Further, as shown in FIG. 10, the mobility management network element further includes:

a first receiving unit 83, configured to receive subscription data sent by a home location register HLR or a home subscriber server HSS.

The first acquiring unit 81 is configured to:

acquire the access control information according to the subscription data received by the first receiving unit 83.

Specifically, as shown in FIG. 10, the first sending unit 82 is further configured to:

send the identity of the PLMN to the HLR or the HSS, so as to request subscription data, corresponding to the PLMN, of the UE.

Optionally, the subscription data includes the RAT allowed and/or the RAT not allowed by the PLMN.

Optionally, the subscription data is access restriction data ARD, but is not limited thereto.

Specifically, the PLMN is included in a PLMN list, and the PLMN list is one or a combination of the following PLMN lists:

a list of PLMNs supported by the mobility management network element or a subset of the PLMN list; a list of PLMNs equivalent to a PLMN supported by the mobility management network element or a subset of the PLMN list; a list of PLMNs equivalent to the PLMN serving the UE or a subset of the PLMN list; a list of PLMNs that have a roaming or a cooperation agreement with a PLMN supported by the mobility management network element or a subset of the PLMN list; a list of PLMNs that have a roaming or cooperation agreement with the PLMN serving the UE or a subset of the PLMN list; a list of PLMNs that belong to a same operator as a PLMN supported by the mobility management network element or a subset of the PLMN list; and a list of PLMNs that belong to a same operator as the PLMN serving the UE or a subset of the PLMN list.

Specifically, as shown in FIG. 10, the first sending unit 82 is configured to:

send a location update request message to the HLR or the HSS, where the location update request message includes indication information and a PLMN list that carries the identity of the PLMN, and the indication information is used to request subscription data corresponding to the identity of the PLMN in the PLMN list.

According to the mobility management network element provided in this embodiment of the present invention, an access network element receives access control information of a user equipment UE that is sent by the mobility management network element, where the access control information includes an identity of a public land mobile network PLMN and a RAT allowed and/or a RAT not allowed by the PLMN; and determines a target RAT for the UE according to the access control information. In this way, according to a correspondence between an RAT and a PLMN in the access control information, a problem that a network access delay is increased and user experience is compromised because an improper PLMN or RAT is selected for a user equipment can be avoided; a problem that it is unfavorable for brand building because an operator has a low user attachment rate in some scenarios can further be solved; and a problem that roaming charges of a UE is extremely high is also solved.

Figure 11:
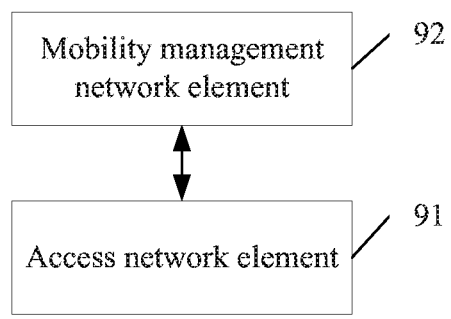
FIG. 11 is a schematic structural diagram of a system for determining a target according to an embodiment of the present invention.

As shown in FIG. 11, a system for determining a target provided in an embodiment of the present invention includes an access network element 91 and a mobility management network element 92, where:

the access network element 91 is configured to receive access control information of a user equipment UE that is sent by the mobility management network element 92, where the access control information includes an identity of a public land mobile network PLMN and a RAT allowed and/or a RAT not allowed by the PLMN; and determine a target RAT for the UE according to the access control information; and the mobility management network element 92 is configured to acquire the access control information of the user equipment UE and send the access control information of the UE to the access network element.

According to the system for determining a target provided in this embodiment of the present invention, an access network element receives access control information of a user equipment UE that is sent by a mobility management network element, where the access control information includes an identity of a public land mobile network PLMN and a RAT allowed and/or a RAT not allowed by the PLMN; and determines a target RAT for the UE according to the access control information. In this way, according to a correspondence between an RAT and a PLMN in the access control information, a problem that a network access delay is increased and user experience is compromised because an improper PLMN or RAT is selected for a user equipment can be avoided; a problem that it is unfavorable for brand building because an operator has a low user attachment rate in some scenarios can further be solved; and a problem that roaming charges of a UE is extremely high is also solved.

The following enumerates entity structures of an access network element and a mobility management network element.

Figure 12:
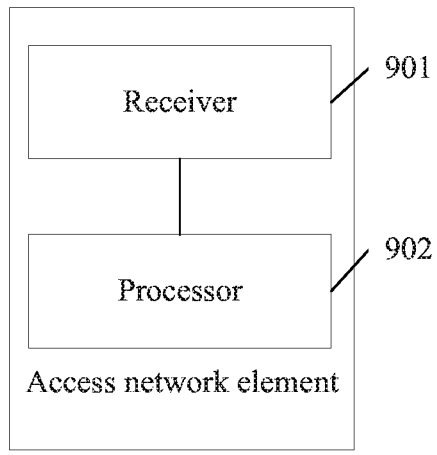
FIG. 12 is a schematic structural diagram of an access network element according to another embodiment of the present invention.

As shown in FIG. 12, an access network element provided in another embodiment of the present invention includes:

a receiver 901, configured to receive access control information of a user equipment UE that is sent by a mobility management network element, where the access control information includes an identity of a public land mobile network PLMN and a RAT allowed and/or a RAT not allowed by the PLMN; and a processor 902, configured to determine a target RAT for the UE according to the access control information.

Specifically, the PLMN includes a PLMN allowing access of the UE, or an equivalent PLMN of a PLMN serving the UE.

Optionally, the processor 902 is configured to:

migrate, according to the identity of the PLMN and the RAT allowed and/or the RAT not allowed by the PLMN, the UE to the RAT allowed by the PLMN.

Optionally, the processor 902 is further configured to:

avoid migrating, according to the identity of the PLMN and the RAT allowed and/or the RAT not allowed by the PLMN, the UE to the RAT not allowed by the PLMN.

According to the access network element provided in this embodiment of the present invention, the access network element receives access control information of a user equipment UE that is sent by a mobility management network element, where the access control information includes an identity of a public land mobile network PLMN and a RAT allowed and/or a RAT not allowed by the PLMN; and determines a target RAT for the UE according to the access control information. In this way, according to a correspondence between an RAT and a PLMN in the access control information, a problem that a network access delay is increased and user experience is compromised because an improper PLMN or RAT is selected for a user equipment can be avoided; a problem that it is unfavorable for brand building because an operator has a low user attachment rate in some scenarios can further be solved; and a problem that roaming charges of a UE is extremely high is also solved.

Figure 13:
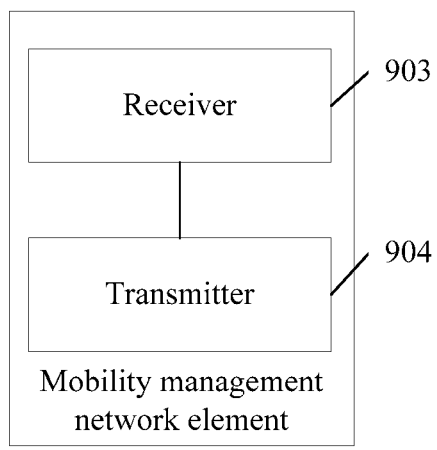
FIG. 13 is a schematic structural diagram of a mobility management network element according to another embodiment of the present invention.

As shown in FIG. 13, a mobility management network element provided in an embodiment of the present invention includes:

a receiver 903, configured to acquire access control information of a user equipment UE; and a transmitter 904, configured to send the access control information of the UE to an access network element, so that the access network element determines a target RAT for the UE according to the access control information, where the access control information includes an identity of a public land mobile network PLMN and a RAT allowed and/or a RAT not allowed by the PLMN.

Specifically, the PLMN includes a PLMN allowing access of the UE, or an equivalent PLMN of a PLMN serving the UE.

Specifically, as shown in FIG. 13, the receiver 903 is configured to receive subscription data sent by a home location register HLR or a home subscriber server HSS, and acquire the access control information according to the subscription data.

Specifically, as shown in FIG. 13, the transmitter 904 is further configured to:

send the identity of the PLMN to the HLR or the HSS, so as to request subscription data, corresponding to the PLMN, of the UE.

Optionally, the subscription data includes the RAT allowed and/or the RAT not allowed by the PLMN.

Alternatively, the subscription data is access restriction data ARD, but is not limited thereto.

Specifically, the PLMN is included in a PLMN list, and the PLMN list is one or a combination of the following PLMN lists:

a list of PLMNs supported by the mobility management network element or a subset of the PLMN list; a list of PLMNs equivalent to a PLMN supported by the mobility management network element or a subset of the PLMN list; a list of PLMNs equivalent to the PLMN serving the UE or a subset of the PLMN list; a list of PLMNs that have a roaming or a cooperation agreement with a PLMN supported by the mobility management network element or a subset of the PLMN list; a list of PLMNs that have a roaming or cooperation agreement with the PLMN serving the UE or a subset of the PLMN list; a list of PLMNs that belong to a same operator as a PLMN supported by the mobility management network element or a subset of the PLMN list; and a list of PLMNs that belong to a same operator as the PLMN serving the UE or a subset of the PLMN list.

Specifically, as shown in FIG. 13, the transmitter is configured to:

send a location update request message to the HLR or the HSS, where the location update request message includes indication information and a PLMN list that carries the identity of the PLMN, and the indication information is used to request subscription data corresponding to the identity of the PLMN in the PLMN list.

According to the mobility management network element provided in another embodiment of the present invention, an access network element receives access control information of a user equipment UE that is sent by the mobility management network element, where the access control information includes an identity of a public land mobile network PLMN and a RAT allowed and/or a RAT not allowed by the PLMN; and determines a target RAT for the UE according to the access control information. In this way, according to a correspondence between an RAT and a PLMN in the access control information, a problem that a network access delay is increased and user experience is compromised because an improper PLMN or RAT is selected for a user equipment can be avoided; a problem that it is unfavorable for brand building because an operator has a low user attachment rate in some scenarios can further be solved; and a problem that roaming charges of a UE is extremely high is also solved.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for determining a target, comprising:
   acquiring, by a mobility management network element, access control information of a user equipment (UE);
   sending, by the mobility management network element, the access control information of the UE to an access network element, wherein the access control information is for determination of a target radio access technology (RAT), and comprises an identity of a public land mobile network (PLMN) and at least one of a RAT allowed by the PLMN and a RAT not allowed by the PLMN; and
   sending, by the mobility management network element to a home location register (HLR) or to a home subscriber server (HSS), a location update request message comprising a PLMN list and indication information, wherein the indication information requests subscription data corresponding to the identity of the PLMN, wherein before acquiring the access control information, the method comprises:
   receiving, by the mobility management network element, subscription data from the HLR or from the HSS; and
   wherein acquiring the access control information comprises acquiring, by the mobility management network element, the access control information according to the received subscription data.

2. The method according to claim 1, wherein the PLMN comprises:
   a PLMN allowing access of the UE.

3. The method according to claim 1, wherein the PLMN comprises:
   an equivalent PLMN of a PLMN serving the UE.

4. The method according to claim 1, wherein the subscription data comprises at least one of the RAT allowed by the PLMN or the RAT not allowed by the PLMN.

5. The method according to claim 1, wherein the subscription data is access restriction data (ARD).

6. The method according to claim 1, wherein the PLMN is comprised in a PLMN list, and the PLMN list is one or a combination of the following PLMN lists:
   a list of PLMNs supported by the mobility management network element or a subset of the PLMN list;
   a list of PLMNs equivalent to a PLMN supported by the mobility management network element or a subset of the PLMN list;
   a list of PLMNs equivalent to the PLMN serving the UE or a subset of the PLMN list;
   a list of PLMNs that have a roaming or a cooperation agreement with a PLMN supported by the mobility management network element or a subset of the PLMN list;
   a list of PLMNs that have a roaming or cooperation agreement with the PLMN serving the UE or a subset of the PLMN list;
   a list of PLMNs that belong to a same operator as a PLMN supported by the mobility management network element or a subset of the PLMN list; or
   a list of PLMNs that belong to a same operator as the PLMN serving the UE or a subset of the PLMN list.

7. The method of claim 1, wherein sending, by the mobility management network element to the HLR or to the HSS, the location update request message comprises sending, by the mobility management network element, to the HSS, the location update request message.

8. A mobility management network element comprising:
   a receiver configured to:
      receive subscription data from to a home location register (HLR or from a home subscriber server (HSS); and
      acquire access control information of a user equipment (UE) according to the subscription data; and
   a transmitter configured to:
      send the access control information of the UE to an access network element, wherein the access control information is for determination of a target radio access technology (RAT), and comprises an identity of a public land mobile network (PLMN) and at least one of a RAT allowed by the PLMN and a RAT not allowed by the PLMN; and send, to or to the HSS, a location update request message comprising a PLMN list and indication information, wherein the indication information requests subscription data corresponding to the identity of the PLMN.

9. The mobility management network element according to claim 8, wherein the PLMN comprises a PLMN allowing access of the UE.

10. The mobility management network element according to claim 8, wherein the PLMN comprises an equivalent PLMN of a PLMN serving the UE.

11. The mobility management network element according to claim 8, wherein the subscription data comprises at least one of the RAT allowed by the PLMN or the RAT not allowed by the PLMN.

12. The mobility management network element according to claim 8, wherein the subscription data is access restriction data (ARD).

13. The mobility management network element according to claim 8, wherein the PLMN is comprised in a PLMN list, and the PLMN list is one or a combination of the following PLMN lists:
a list of PLMNs supported by the mobility management network element or a subset of the PLMN list;
a list of PLMNs equivalent to a PLMN supported by the mobility management network element or a subset of the PLMN list;
a list of PLMNs equivalent to the PLMN serving the UE or a subset of the PLMN list;
a list of PLMNs that have a roaming or a cooperation agreement with a PLMN supported by the mobility management network element or a subset of the PLMN list;
a list of PLMNs that have a roaming or cooperation agreement with the PLMN serving the UE or a subset of the PLMN list;
a list of PLMNs that belong to a same operator as a PLMN supported by the mobility management network element or a subset of the PLMN list; or
a list of PLMNs that belong to a same operator as the PLMN serving the UE or a subset of the PLMN list.

14. The mobility management network element according to claim 8, wherein the transmitter is configured to send, by the mobility management network element, to the HSS, the location update request message.

15. A non-transitory computer readable storage medium storing a program for execution by a processor, the program including instructions for:

receive subscription data from a home location register (HLR) or from a home subscriber server (HSS), before acquiring access control information; and
acquiring, by a mobility management network element, the access control information of a user equipment (UE) according to the received subscription data;
sending, by the mobility management network element, the access control information of the UE to an access network element, wherein the access control information is for determination of a target radio access technology (RAT), and comprises an identity of a public land mobile network (PLMN) and at least one of a RAT allowed by the PLMN and a RAT not allowed by the PLMN; and
sending, by the mobility management network element to the HLR or to the HSS, a location update request message comprising a PLMN list and indication information, wherein the indication information requests subscription data corresponding to the identity of the PLMN;
wherein the instructions to acquire the access control information comprise instructions to acquire the access control information.

16. The non-transitory computer readable storage medium according to claim 15, wherein the PLMN is comprised in a PLMN list, and the PLMN list is one or a combination of the following PLMN lists:
a list of PLMNs supported by the mobility management network element or a subset of the PLMN list;
a list of PLMNs equivalent to a PLMN supported by the mobility management network element or a subset of the PLMN list;
a list of PLMNs equivalent to the PLMN serving the UE or a subset of the PLMN list;
a list of PLMNs that have a roaming or a cooperation agreement with a PLMN supported by the mobility management network element or a subset of the PLMN list;
a list of PLMNs that have a roaming or cooperation agreement with the PLMN serving the UE or a subset of the PLMN list;
a list of PLMNs that belong to a same operator as a PLMN supported by the mobility management network element or a subset of the PLMN list; or
a list of PLMNs that belong to a same operator as the PLMN serving the UE or a subset of the PLMN list.

17. The non-transitory computer readable storage medium according to claim 15, the instructions to send, by the mobility management network element to the HLR or to the HSS, the location update request message comprises instructions to send, by the mobility management network element, to the HSS, the location update request message.

* * * * *